(No Model.)
P. REBER.
SLIDING CALIPERS OR GAGE.
No. 514,685.
Patented Feb. 13, 1894.
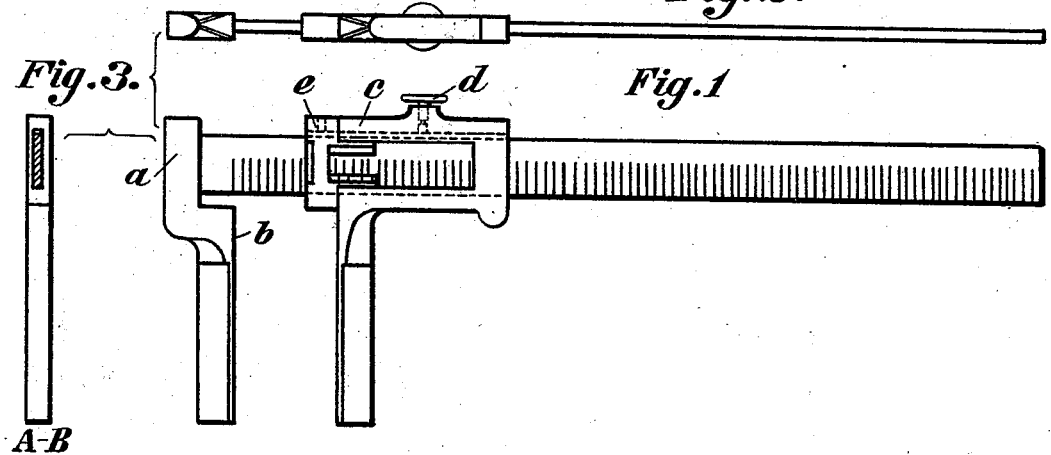
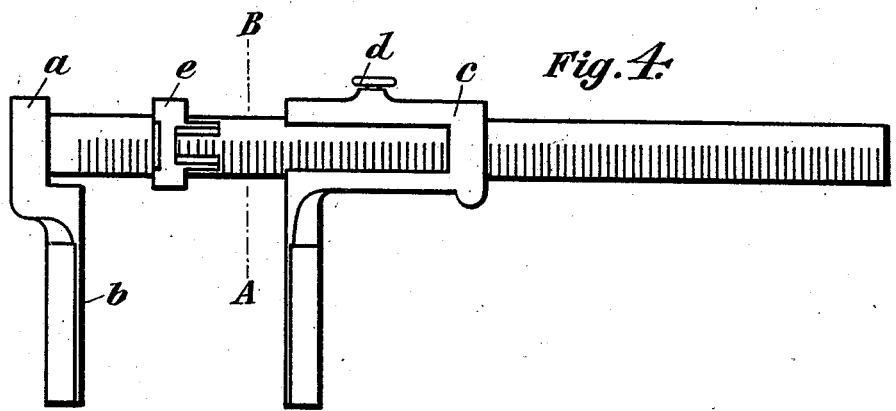
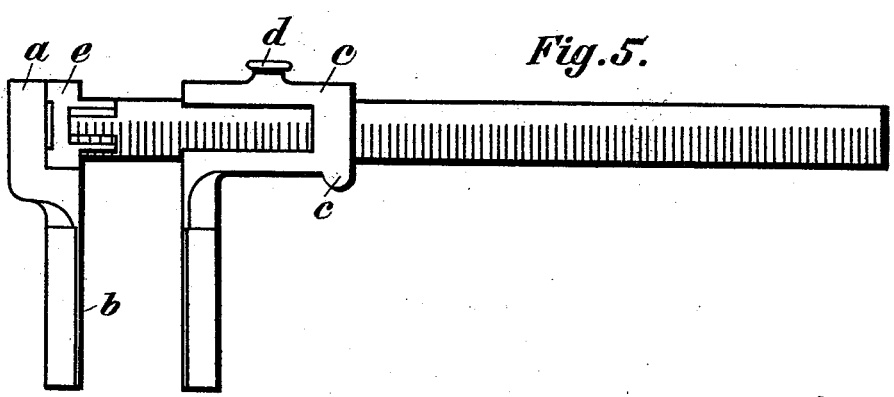
Witnesses:
Inventor:
Paul Reber
By Whitaker & Prevost, Attys.

UNITED STATES PATENT OFFICE.

PAUL REBER, OF ESSLINGEN, GERMANY.

SLIDING CALIPERS OR GAGE.

SPECIFICATION forming part of Letters Patent No. 514,685, dated February 13, 1894.

Application filed July 28, 1893. Serial No. 481,752. (No model.)

*To all whom it may concern:*

Be it known that I, PAUL REBER, a subject of the Emperor of Germany, residing at Esslingen, in the Kingdom of Würtemberg and Empire of Germany, have invented certain new and useful Improvements in or Relating to Sliding Calipers or Gages, of which the following is a specification.

The present invention relates to a sliding caliper or gage with an extra loose slide for the purpose of enabling the correct reading to be obtained, even after the ordinary slide or leg has been moved.

The accompanying drawings give illustrations of the sliding caliper or gage constructed according to my invention.

Figure 1 is an elevation, Fig. 2 is an edge view, and Fig. 3 is a cross section, of my improved sliding caliper or gage. Fig. 1 shows the sliding caliper or gage after having taken a measure and with the loose slide close to the movable leg. Fig. 4 is a similar view to Fig. 1, but showing the movable leg pushed away from the loose slide for reading. Fig. 5 shows the sliding caliper or gage when used without the reading slide.

The construction of, and manner of using, the improved sliding caliper or gage are as follows: One end of the divided or graduated bar is provided with a rigid cranked leg $a$, which is fixed in such a manner as to bring the surface $b$ thereof exactly in line with the first division of the scale. The second leg $c$ is made to slide on the divided or graduated bar and can be fixed by means of a set screw $d$. Interposed between the two legs is a loose slide $e$, which forms the characteristic feature of the improved sliding caliper or gage, and which may simply be provided with a single mark, or else, in better class instruments, may be provided with a vernier. The said loose or intermediate slide $e$ is constructed so as to enter the recess formed at the foot of the fixed leg $a$ near the bar when the sliding caliper or gage is closed. If, in measuring, the leg $c$ should become displaced, by taking the slide gage off the object just measured, or otherwise, the readings can still be correctly read as the intermediate slide $e$ does not participate in the accidental outward movement of the loose leg $c$. The arrangement also enables two measures to be taken at once, viz., one by means of the intermediate slide $e$, and the second measure with the legs $a$ $c$ only, in the usual manner.

Having fully described my invention, what I desire to claim and secure by Letters Patent is—

1. A sliding caliper or gage having a movable intermediate slide $e$, with or without vernier, arranged between the two legs $a$ $c$ in such a manner as to enable the correct measure to be read off notwithstanding any accidental or other displacement of the movable leg $c$ of said sliding caliper or gage, substantially as herein shown and described.

2. In a sliding caliper or gage, the combination of a graduated bar, a fixed cranked leg at one end of said bar, a sliding leg on such bar, and an intermediate slide between such fixed leg and sliding leg, substantially as herein shown and described.

3. In a sliding caliper or gage having a graduated bar, a fixed leg and a sliding leg, the combination therewith of an intermediate slide between such legs, substantially as herein shown and described.

In testimony whereof I have hereunto set my hand in presence of two witnesses.

PAUL REBER.

Witnesses:
JOSEPH WEIDELENOR,
KARL RAUSCH.